United States Patent [19]
Kunz

[11] Patent Number: 5,937,698
[45] Date of Patent: Aug. 17, 1999

[54] CENTRIFUGAL PROPULSION SYSTEM

[76] Inventor: William T. Kunz, 2427 Bramblebush Ct., Reston, Va. 22091

[21] Appl. No.: 08/902,360

[22] Filed: Jul. 29, 1997

[51] Int. Cl.$^6$ .............................. F16H 27/04; F16H 33/10
[52] U.S. Cl. .............................................. 74/84 R; 74/845
[58] Field of Search ................................... 74/84 R, 845, 74/86, 87

[56] References Cited

U.S. PATENT DOCUMENTS

| | | |
|---|---|---|
| 2,960,314 | 11/1960 | Bodine, Jr. ................................... 74/86 |
| 3,192,839 | 7/1965 | Vivier .......................................... 74/87 |
| 3,916,704 | 11/1975 | Gaberson . |
| 3,968,700 | 7/1976 | Cuff . |
| 4,095,460 | 6/1978 | Cuff . |
| 4,238,968 | 12/1980 | Cook . |
| 4,261,212 | 4/1981 | Melnick . |
| 4,347,752 | 9/1982 | Dehen ..................................... 74/84 R |
| 4,479,396 | 10/1984 | deWeaver . |
| 4,631,971 | 12/1986 | Thornson . |
| 4,712,439 | 12/1987 | North . |
| 4,784,006 | 11/1988 | Kethley ..................................... 74/84 R |
| 5,031,711 | 7/1991 | Tanaka et al. . |
| 5,150,626 | 9/1992 | Navarro et al. . |

FOREIGN PATENT DOCUMENTS 2131516  6/1984  United Kingdom ................... 74/84 R

*Primary Examiner*—Rodney H. Bonck
*Assistant Examiner*—Roger Pang
*Attorney, Agent, or Firm*—Birch, Stewart, Kolasch & Birch, LLP

[57]  ABSTRACT

A centrifugal force propulsion device includes an eccentric rotor rotatably mounted to a base via a shaft. The rotor has an aperture therein which is substantially larger than the shaft, such that the rotor is able to rotate at speed away from the shaft, as well as move longitudinally perpendicular to the axis of rotation. A drive motor drives the rotor through a stretchable flexible belt. As centrifugal force rotates the rotor toward a longitudinal standing position alone away from the shaft and drive motor, and as the drive belt is stretched, the increased tension therein pulls the drive motor and base ahead following the rotor, thus pulling the device in a desired direction.

20 Claims, 3 Drawing Sheets

CENTRIFUGAL PROPULSION SYSTEM

BACKGROUND OF THE INVENTION

1. Field of the Invention

The present invention relates to a device for converting centrifugal force into linear motion. More particularly, the present invention relates to a device which utilizes centrifugal force to return and hold in balance a mounted-out-of-balance rotor creating a thrust that is transferred by a belt to propel the device in a chosen direction, as described herein.

At rest, a rotor is pressured to one side, off-balance, in a wide central bearing aperture by the tension of a belt around its circumference to a motor pulley attached to the base of the device. At high speed, centrifugal force generated by the rotor creates its own suspended rotational balance centered within the aperture. This increases the tension of the belt to the motor, thus pulling with full power the base and the device in the opposite direction of the original tension.

2. Description of the Background Art

Various devices for utilizing centrifugal force to propel a vehicle are known in the art. For example, U.S. Pat. No. 4,261,212 discloses a wheeled vehicle on which two counter-rotating masses are arranged for rotation about spaced-apart vertical axes. The two centrifugal force generators are operated in synchronism to produce a forwardly directed force. The eccentricity of the centrifugal force generators may be varied by movement of weights along endless flexible members. Additionally, U.S. Pat. No. 4,238,968 discloses a device which utilizes a pair of counter-rotating arms for the conversion of centrifugal force to linear force and motion. Finally, U.S. Pat. No. 3,968,700 discloses a plurality of rotating masses which are arranged to produce centrifugal force components in the desired direction of travel in order to produce a single propulsive force acting in one direction.

The prior art devices are very complex, and require sophisticated mechanisms to coordinate the movement of the plurality of rotating masses.

SUMMARY OF THE INVENTION

Accordingly, it is an object of the present invention to provide a device for converting the application of centrifugal force to a controlled imbalanced rotation into linear motion.

It is a further object of the present invention to provide a device which utilizes centrifugal force to produce a thrust which propels the device in a particular direction.

Yet another object of the present invention is to provide a device to propel a vehicle independent of the mechanical interface between the device and the external environment.

A further object of the present invention is to produce a source of propulsion that is versatile enough for a wide variety of applications and can replace more complex mechanisms which achieve propulsion through less efficient mechanical interfaces with the external environment.

These and other objects of the present invention are fulfilled by a device for developing a linear force including a rotor mounted to a base, and rotatable about a shaft attached to the base. A drive motor (or other power source) is attached to the base which drives rotation of the rotor through a stretchable drive belt. The rotor has an aperture in or near its center which has a cross-sectional area considerably larger than the cross-sectional area of the shaft. The rotor at rest or at slow speed is pulled off balance toward the motor in the aperture by the basic tension of the belt. Rotation of the rotor at sufficient speed about the shaft produces a centrifugal force in the rotor to cause its separation away from the shaft and establishment of an independent suspended rotational center within the aperture, bringing the rotor to balance. This increases the distance and tension in the drive belt between the rotor and the motor, thereby producing a linear motion of the base. When this linear motion occurs, the rotational imbalance again occurs which is countered by the centrifugal force, resulting in continual motion as long as sufficient rotational speed is maintained.

Further scope of applicability of the present invention will become apparent from the detailed description given hereinafter. However, it should be understood that the detailed description and specific examples, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
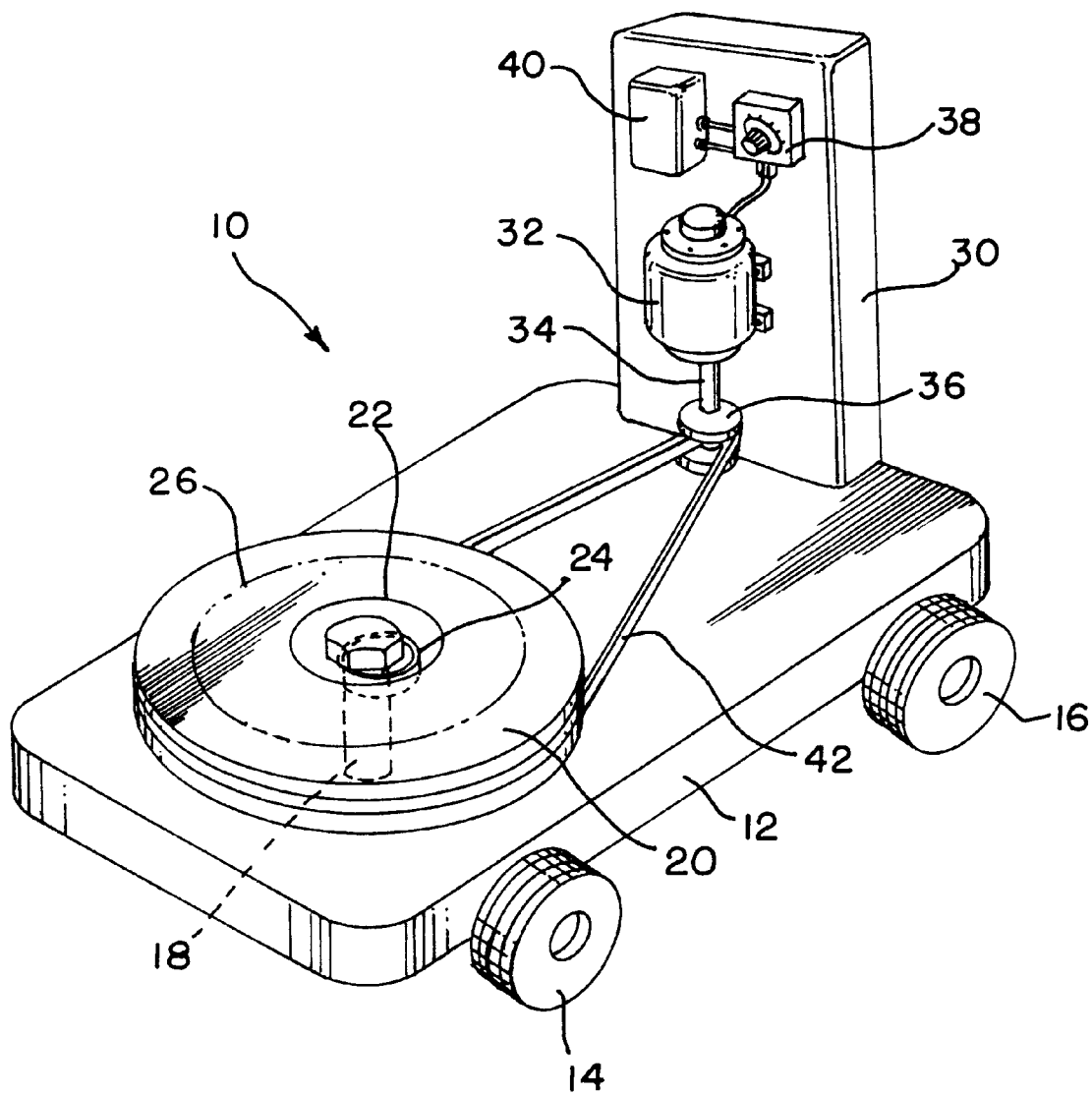
FIG. 1 is a perspective view of the centrifugal force propulsion device of the present invention.

Referring in detail to the drawings and with particular reference to FIG. 1, a centrifugal force propulsion device is shown as attached to and as components of a simple wheeled mechanism 10. This illustrative embodiment was chosen because it is simple in design and illustrates the principal and mechanics of thrust which can readily be applied to other types of mechanisms using a variety of power sources and logistical platforms.

The illustrative device 10 includes a base 12 to which a pair of front wheels 14 and a pair of rear wheels 16 are rotatably mounted. The wheels 14, 16 facilitate movement of the illustrative device across land. Although four wheels are shown in the illustrative embodiment, it should be understood that the presence and number of wheels utilized are characteristic of the logistical platforms to which the centrifugal propulsion device may be attached rather than the device itself. The device may be configured without wheels to operate as a sled, with or without runners. Alternatively, it may be attached to or configured in the form of a boat for movement across the surface of a body of water. Also, the base 12 may constitute a housing permitting the device to move through air and space, or under water.

A shaft 18 extends upwardly from the base. A rotor 20 having an aperture 22 therein is rotatably mounted around the shaft 18. An intermediate roller member 24 is shown in the illustration as between the interior of the aperture 22 and the exterior of the shaft 18, as shown in FIG. 1. The intermediate roller member 24 is not shown in the remaining figures for clarity, and since it is not essential for operation of the device. The rotor 20 is held to the base 12 by a stop member 26 (see FIG. 4), which is shown in phantom lines in FIGS. 1 and 2 for clarity.

Figure 3:
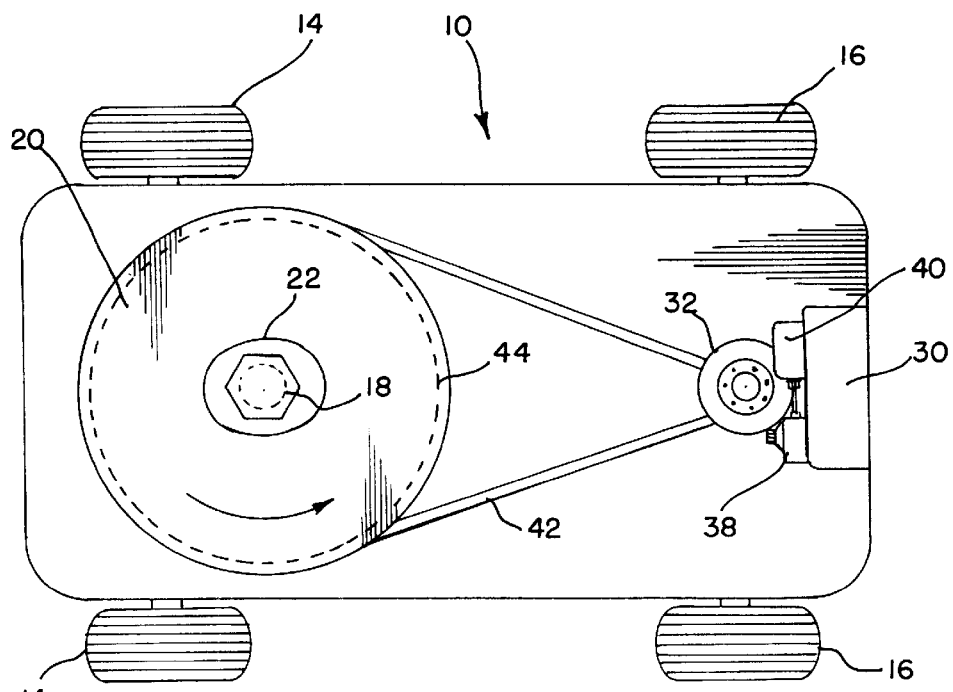
FIG. 3 is a plan view of the centrifugal force propulsion device following rotation of the rotor at high speed and pulling the elastic belt to a fully stretched position thereby pulling the motor and base.
Figure 4:
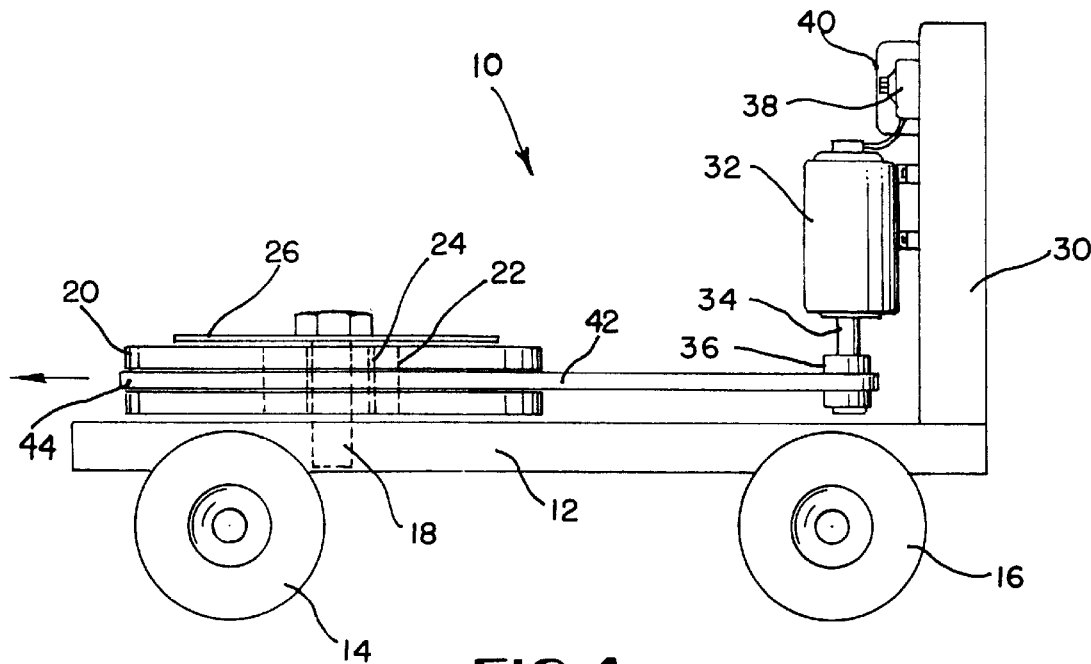
FIG. 4 is a side view of the centrifugal force propulsion device.
Figure 5:
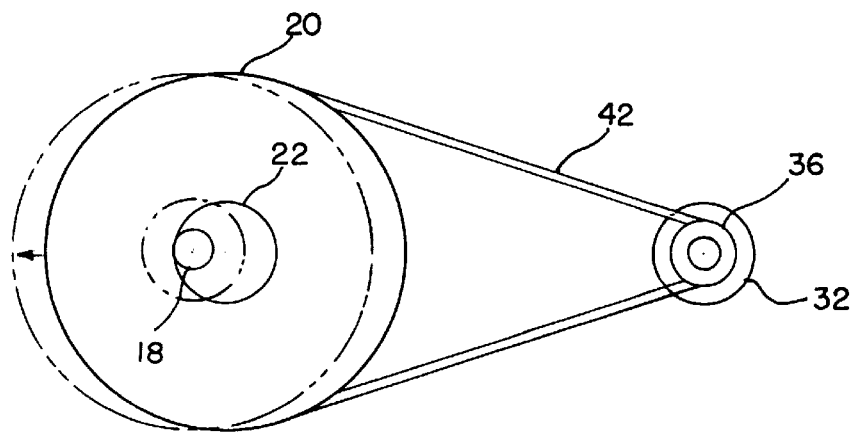
FIGS. 5 and 6 are schematic views showing alternative embodiments of the eccentric rotor and aperture configurations.
Figure 6:
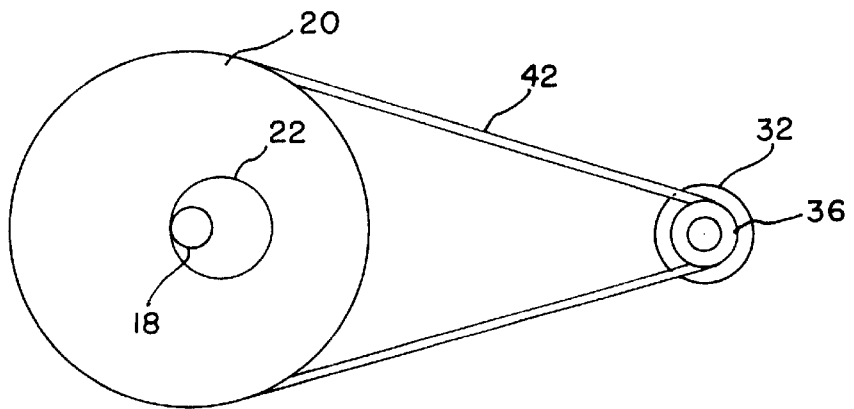

The aperture 22 may be configured in an oval shape as shown in FIGS. 1–4, or may be circular as shown in FIGS. 5 and 6. Further, the aperture may be mounted such that the center of the aperture is located at the center of the rotor as shown in FIGS. 1–5 or the center of the aperture may be displaced from the center of the rotor as shown in FIG. 6.

A support member 30 extends from the base 12 providing support to the drive components in this illustrative embodiment, although the drive components could be more directly attached to the base or to some other support platform (e.g., vehicle body, etc.). A driving force (an electric motor in the illustrative embodiment) is attached to the support member 30 and includes an output shaft 34 extending therefrom. A drive pulley 36 is attached to the output shaft 34 and is driven by the electric motor. Speed of the electric motor is controlled by a speed control mechanism, such as a rheostat or potentiometer 38. In the illustrative embodiment, electricity is supplied to the electric motor from a power source, such as a battery 40.

Although an electric motor is shown in the illustrated embodiment, it should be understood that alternative forms of motive power sources may be utilized, such as an internal combustion engine, in which speed is controlled by an appropriate throttle mechanism.

Driving force from the motive power source (electric motor) is transferred from the drive pulley 36 through a drive belt 42 to the rotor 20. The drive belt 42 is a flexible endless elastic member which may stretch and contract. In the illustrative embodiment, the drive belt 42 is made of a resilient elastic material such as rubber. The drive belt 42 extends around the circumference of the rotor 20, which may be provided with a groove shaped to correspond with the particular characteristics and shape of the drive belt 42, as shown in FIG. 4.

Operation of the centrifugal force propulsion device is described below and illustrated by the mechanism chosen as an illustrative embodiment thereof, with particular reference made to FIGS. 2 and 3.

Figure 2:
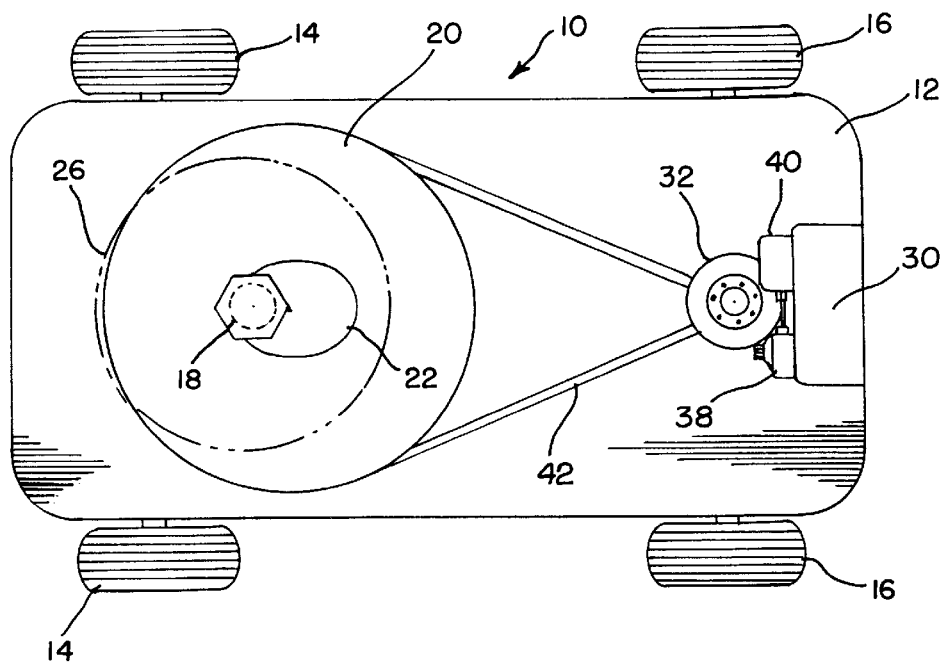
FIG. 2 is a plan view of the centrifugal force propulsion device showing the elastic belt in a fully contracted position prior to the rotors action at centrifugal speed.

FIG. 2 shows the rotor 20 in a position closest to the drive pulley 36, wherein the drive belt 42 is in a fully extended but not stretched position. As the drive pulley 36 operates in a clockwise or counterclockwise directions shown in FIG. 1, the rotor also rotates in the same direction about the shaft. Alternatively, the outermost portion of the aperture 22 may be engaged with an intermediate roller member 24, which in turn contacts the shaft 18.

As the rotor 20 begins to rotate, it rotates about the shaft 18 without significant change in the relationship of the position of the shaft within the aperture as the flexible belt 42 holds the rotor 20 off balance in that position. The rotor 20 performs an imbalanced rotation around the shaft 18 as drive power is increased, until rotational speed increases to the point where centrifugal force impacts the rotational plane and axis.

As the rotational speed increases, centrifugal force develops in response to the rotation of the rotor 20. When the centrifugal force achieves a power level in excess of the centripetal force being exercised by the tension of the drive belt 42 in the direction of its attachment to the pulley 36, the rotational axis is shifted toward the center of the aperture 22, as shown in FIG. 3. Pressure on the drive belt 42 resulting from the centrifugal force generated causes it to stretch and extend in the direction away from the pulley 36 toward the establishment of a new rotational axis at the center of the aperture 22, to correct imbalance caused by rotation around a perimeter of the aperture 22. Extension of the drive belt 42 also pulls the pulley 36 towards the rotor 20 and consequently the entire mechanism (including the motor 32, support member 30, and base) all move in the direction of the rotor (leftward, as shown in FIG. 3).

The movement of the entire mechanism recreates the imbalance and centrifugal force further moves the rotational axis to correct the imbalance. The resulting perpetual rotational imbalance and centrifugal force redefining of the rotational axis in turn continues to stretch the drive belt and produces linear movement of the device.

As set forth above, the components of the propulsion device include 1) a source of driving force (an electric motor 32, battery 40, power control mechanism-speed control 38 are illustrated), 2) power conversion implements (output shaft 34 and drive pulley 36 are illustrated), 3) a flexible endless drive belt (42 in the illustrations) which may stretch and contract, 4) a rotor (20 in the illustrations) having 5) an aperture (22 in the illustrations) that is significantly larger in radius than and rotatably mounted around 6) a shaft (18 in the illustrations) to which the pulley-powered belt (42 in the illustrations) is configured so as to be fully extended (prior to stretching) with the shaft pressing against the outermost (i.e., from the drive pulley) portion of the aperture and the rotor is in a position closest to the drive pulley when the device is at rest, and 7) a fixed base to which these components are attached.

The configuration of the components in relationship to each other as described is an essential drive component of the device, an example of which is presented in the illustrative embodiment. The size of the aperture determines power vs. speed to be obtained from the device and the amount of tension to be applied by the belt. The larger the aperture and the lesser tension is equivalent to a high gear in that it creates greater speed or distance of movement in relation to thrust as compared to a smaller aperture, which while still maintaining an imbalanced rotor, creates greater power in relation to speed, as with lower gears in gear systems. A system of changing (shifting) apertures and belts can be used while the device is in motion.

The speed of the electric motor is adjusted to provide the above desired operation. Also, although counterclockwise rotation has been described, the rotor 20 may be rotated in a clockwise direction as well.

The size of the rotor is variable depending upon the power level required. However, it is best to hold the weight of the rotor to a minimum and increase the size and speed of the rotor as needed to achieve the desired propulsion force. It should be noted that small rotors turning at greater speeds deliver a remarkable force.

The rotors shown in FIGS. 1–4 are oriented for rotation about a vertical axis, such that the rotor 20 rotates in a horizontal plane. However, the device 10 may be configured such that the rotor 20 rotates in a vertical plane, or in an inclined plane. Rotation of the rotor 20 in a vertical plane may be particularly applicable to the propulsion of a device such as a bicycle, which has a generally vertical frame.

When the rotor 20 is oriented for rotation in a vertical plane, the support member 30 forms a lowermost part of the device 10, wherein the rotation of the rotor 20 produces a vertical propulsion force, which may be utilized in a device such as an elevator.

FIGS. 5 and 6 show alternative embodiments of the rotor 20 and the aperture 22. FIG. 5 shows a rotor 20 having a circular aperture 22 located at the center of the rotor.

FIG. 6 shows a rotor 20 having a circular aperture 22 which is displaced from the center of the rotor 20. As shown in FIGS. 5 and 6, the diameter of the aperture 22 is substantially larger than the diameter of the shaft 18. Accordingly, the cross-sectional area of the aperture 22 is larger than the cross-sectional area of the shaft 18. Preferably, the cross-sectional area of the aperture 22 is at least twice as large as the cross-sectional area of the shaft 18.

When utilizing a circular aperture 22, it is desirable that the diameter of the aperture 22 be at least 3 times the diameter of the shaft and have a maximum diameter of one-half of the radius of the rotor. Because the aperture 22 is substantially larger than the shaft 18, it is possible for the rotor 20 to not only rotate about the shaft 18, but also move perpendicular to the axis of rotation of the rotor 20 in a direction toward or away from the drive pulley 36.

The base 12 utilized without the wheels 14, 16 may be adapted for use on conventional vehicles. For example, the base 12 may be applied to the deck of a boat or a ship for propelling the craft. Further, if the base 12 is pivotally mounted to the deck of the ship, it is possible to steer the ship in a desired direction according to the direction in which the base 12 is pivoted on the ship deck. Essentially, since the base 12 may be attached any vehicle, it would be possible to propel as well as steer any vehicle to which the base 12 of the centrifugal force propulsion device 10 is attached.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device comprising:
   a frame;
   a constraint member attached to said frame;
   a rotor having an aperture therein and rotatable about said constraint member;
   a drive source attached to said frame for rotating said rotor; and
   a stretchable endless member located between said drive source and said rotor,
   whereby said aperture has a cross-sectional area at least three times as large as a cross-sectional area of said constraint member.

2. The device according to claim 1, wherein said aperture is a substantially circular aperture.

3. The device according to claim 2, wherein the center of said substantially circular aperture is located at the center of said rotor.

4. The device according to claim 2, wherein the center of said substantially circular aperture is displaced from the center of the rotor.

5. The device according to claim 1, wherein said aperture is oval-shaped.

6. The device according to claim 1, wherein said aperture passes through the center of the rotor.

7. The device according to claim 1, further comprising an intermediate roller member located within said aperture and surrounding a portion of said constraint member, said intermediate roller member being freely rotatable on said constraint member.

8. The device according to claim 1, wherein said drive source is an electric motor, and further including a speed control for controlling a speed of said electric motor.

9. A device for developing a linear force comprising:
   a base;
   a rotor rotatably mounted to said base;
   a constraint member attached to said base for rotatably mounting said rotor and allowing translational movement of said rotor in a direction substantially perpendicular to an axis of rotation of said rotor;
   a drive source for producing a rotational drive force; and
   a stretchable member for transmitting said rotational drive force from said drive source to said rotor, whereby centrifugal force generated by high speed rotation of said rotor produces a centering and a pulling movement of said rotor, thereby generating said linear force.

10. The device according to claim 9, further comprising an aperture in said rotor, said aperture having a cross-sectional area at least three times as large as a cross-sectional area of said constraint member.

11. The device according to claim 9, wherein said aperture passes through the center of the rotor.

12. The device according to claim 9, wherein said drive source is an electric motor, and further including a speed control for controlling a speed of said electric motor.

13. A device for converting centrifugal force into linear motion comprising:
   a base;
   a shaft extending from said base, said shaft having a first cross-sectional area;
   a rotor rotatably mounted on said base, said rotor having an aperture therein into which said shaft extends, said aperture having a second cross-sectional area at least three times as large as said first cross-sectional area of said shaft;
   a drive motor attached to said base and having a drive pulley attached thereto; and
   a flexible stretchable drive belt entrained around said drive pulley and said rotor for transmitting a rotational drive force from said drive motor to said rotor,
   whereby high speed rotation of said rotor about said shaft produces a centrifugal force in said rotor to cause said rotor to move in a direction away from said drive motor, thus increasing a tension in said drive belt which pulls the drive motor toward the rotor, thereby producing a resulting linear motion of said base.

14. The device according to claim 13, wherein said aperture is a substantially circular aperture.

15. The device according to claim 14, wherein the center of said substantially circular aperture is located at the center of said rotor.

16. The device according to claim 14, wherein the center of said substantially circular aperture is displaced from the center of said rotor.

17. The device according to claim 13, wherein said aperture is oval-shaped.

18. The device according to claim 13, wherein said aperture passes through the center of the rotor.

19. The device according to claim 13, further comprising an intermediate roller member located within said aperture and surrounding a portion of said shaft, said intermediate roller member being freely rotatable as a bearing on said shaft.

20. The device according to claim 13, wherein said drive motor is an electric motor, and further including a speed control for controlling a speed of said electric motor.

* * * * *